US012792741B2

(12) United States Patent
Bagh

(10) Patent No.: US 12,792,741 B2
(45) Date of Patent: Nov. 10, 2026

(54) SYSTEM AND METHOD FOR GOVERNANCE AND MANAGEMENT OF ENTERPRISE SOFTWARE

(71) Applicant: Wells Fargo Bank, N.A., San Francisco, CA (US)

(72) Inventor: Susan Evangeline Bagh, Cave Creek, AZ (US)

(73) Assignee: Wells Fargo Bank, N.A., San Francisco, CA (US)

( * ) Notice: Subject to any disclaimer, the term of this patent is extended or adjusted under 35 U.S.C. 154(b) by 134 days.

(21) Appl. No.: 18/817,032

(22) Filed: Aug. 27, 2024

(65) Prior Publication Data

US 2024/0419811 A1 Dec. 19, 2024

Related U.S. Application Data

(63) Continuation of application No. 17/663,309, filed on May 13, 2022, now Pat. No. 12,105,807.

(51) Int. Cl.

| | |
|---|---|
| ***G06F 21/57*** | (2013.01) |
| ***G06F 8/41*** | (2018.01) |
| ***G06F 8/75*** | (2018.01) |
| ***G06F 21/52*** | (2013.01) |

(52) U.S. Cl.
CPC ............ *G06F 21/577* (2013.01); *G06F 8/433* (2013.01); *G06F 8/75* (2013.01); *G06F 21/52* (2013.01)

(58) Field of Classification Search
CPC ... G06F 8/71; G06F 8/73; G06F 21/10; G06F 21/105; G06F 21/50; G06F 21/52; G06F 21/577
See application file for complete search history.

(56) References Cited

U.S. PATENT DOCUMENTS 6,766,305 B1 * 7/2004 Fucarile ................ G06F 21/101 705/317
10,229,251 B1 * 3/2019 Dalessio ............. G06F 21/1073
10,691,808 B2 6/2020 Brucker et al.
(Continued)

OTHER PUBLICATIONS

U.S. Appl. No. 17/663,309, filed May 13, 2022, System and Method for Governance and Management of Enterprise Software.
(Continued)

*Primary Examiner* — Joshua Joo
(74) *Attorney, Agent, or Firm* — SCHWEGMAN LUNDBERG & WOESSNER, P.A.

(57) ABSTRACT

Disclosed in some examples is an enterprise software management system (ESMS) that manages procurement, deployment, security, and maintenance of software in large enterprises. The ESMS may include one or more of a software tracking component, a software component storage component, a licensing repository component, a software vulnerabilities detection component, and a software risk management component. The ESMS governs and manages software applications and components to reduce legal, security, and other risks to the enterprise environment. The ESMS solves the technical problem of tracking and managing software and components using the technical solution of a tracking framework that utilizes interconnected systems that document, track, and ensure compliance with enterprise software goals.

20 Claims, 4 Drawing Sheets

(56) References Cited

U.S. PATENT DOCUMENTS

| | | | | |
|---|---|---|---|---|
| 2005/0114265 | A1* | 5/2005 | Satkunanathan | G06F 21/10 705/59 |
| 2005/0132347 | A1 | 6/2005 | Harper et al. | |
| 2006/0059100 | A1* | 3/2006 | Ronning | G06Q 20/1235 705/59 |
| 2007/0038983 | A1* | 2/2007 | Stienhans | G06F 8/70 717/127 |
| 2011/0126288 | A1 | 5/2011 | Schloegel et al. | |
| 2012/0072887 | A1* | 3/2012 | Basak | G06F 11/323 717/123 |
| 2016/0062764 | A1* | 3/2016 | Boudreau | G06F 8/73 717/121 |
| 2017/0098064 | A1* | 4/2017 | Mahan | G06F 21/10 |
| 2017/0147338 | A1* | 5/2017 | Jackson | G06F 8/77 |
| 2017/0169229 | A1* | 6/2017 | Brucker | G06F 21/566 |
| 2017/0308685 | A1* | 10/2017 | Terry | G06F 21/105 |
| 2017/0346847 | A1 | 11/2017 | Borohovski et al. | |
| 2017/0357809 | A1* | 12/2017 | Smith | G06Q 10/06398 |
| 2018/0060225 | A1* | 3/2018 | Tao | G06F 11/3692 |
| 2018/0121657 | A1* | 5/2018 | Hay | G06F 21/51 |
| 2018/0137288 | A1 | 5/2018 | Polyakov | |
| 2018/0150639 | A1* | 5/2018 | Abramovsky | G06F 21/577 |
| 2019/0370471 | A1* | 12/2019 | Petratos | G06F 8/656 |
| 2020/0042719 | A1* | 2/2020 | Kelley | G06F 21/56 |
| 2020/0401390 | A1* | 12/2020 | Borthakur | G06F 8/61 |
| 2022/0012341 | A1* | 1/2022 | Sarkar | G06F 21/566 |
| 2022/0222324 | A1 | 7/2022 | Huang et al. | |
| 2022/0232040 | A1 | 7/2022 | Crabtree et al. | |
| 2022/0366057 | A1 | 11/2022 | Kelley et al. | |
| 2023/0281321 | A1 | 9/2023 | Palanki et al. | |
| 2023/0359469 | A1 | 11/2023 | Burman et al. | |
| 2023/0418835 | A1* | 12/2023 | Banerjee | G06F 16/252 |
| 2024/0103889 | A1* | 3/2024 | Hahn | G06F 8/38 |
| 2024/0152623 | A1 | 5/2024 | Hulick, Jr. et al. | |
| 2024/0289450 | A1* | 8/2024 | Ketireddy | G06F 21/566 |

OTHER PUBLICATIONS

"U.S. Appl. No. 17/663,309, Corrected Notice of Allowability mailed Jun. 7, 2024", 2 pgs.

"U.S. Appl. No. 17/663,309, Notice of Allowance mailed May 24, 2024", 10 pgs.

"Artifactory—Universal Artifact Repository Manager", JFrog, [Online]. Retrieved from the Internet: <URL: https://jfrog.com/artifactory/?utm_source=google&utm_medium=cpc&utm_campaign=Search|DSK|BrandAwareness|SearchPartners|NA|202202&utm_term=artifactory&utm_network=g&cq_plac=&cq_p>, (Accessed Apr. 26, 2022), 7 pgs.

"Black Duck Software Composition Analysis", Synopsys, Inc., [Online]. Retrieved from the Internet: <URL: https://www.synopsys.com/software-integrity/security-testing/software-composition-analysis.html>, (Accessed Apr. 26, 2022), 14 pgs.

"Software Composition Analysis Tool", JFrog Xray, [Online]. Retrieved from the Internet: <URL: https://jfrog.com/xray/>, (Accessed Apr. 26, 2022), 7 pgs.

"State of Software Security: Open Source Edition", Veracode, Inc., [Online]. Retrieved from the Internet: <URL: https://info.veracode.com/report-state-of-software-security-open-source-edition.html>, (Accessed Jul. 25, 2022), 3 pgs.

"State of Software Security: Open Source Edition Report", Veracode, Inc., [Online]. Retrieved from the Internet: <URL: https://info.veracode.com/report-state-of-software-security-open-source-edition.html>, (Accessed Aug. 31, 2022), 47 pgs.

"Veracity—The Next Step in DVCS", [Online]. Retrieved from the Internet: <URL: veracity- scm.com>, (Accessed Apr. 26, 2022), 2 pgs.

"Black Duck Open Source Audits", Synopsys, Inc., [Online]. Retrieved from the Internet URL https www.synopsys.com software-integrity open-source-software-audit.html, Accessed on Apr. 26, 2022, 6 pgs.

* cited by examiner

SYSTEM AND METHOD FOR GOVERNANCE AND MANAGEMENT OF ENTERPRISE SOFTWARE

CROSS-REFERENCE TO RELATED APPLICATION

This application is a continuation of U.S. patent application Ser. No. 17/663,309, filed May 13, 2022, which is incorporated by reference herein in its entirety.

TECHNICAL FIELD

Embodiments pertain to a consistent and automated framework and process to govern and manage enterprise software and software components. Embodiments relate to frameworks for automated governance and management of software libraries deployed within an enterprise environment. Governance includes consistent management and governance of software libraries and their lifecycle for effective risk management and compliance. Lifecycle management includes (but is not limited to) version control, license management, patching, vulnerability, dependency, lineage management, component upgrades, audit, reconciliation, usage, security and inventory management.

BACKGROUND

Software code is a fundamental part of IT application development and effectively managing these software components is critical for operational excellence. Developers creating software may utilize a number of different software components. These components may link into the source code of the software component at compile time. The components may be open-source and downloaded from one or more locations on the Internet. They may contain freeware, trialware or free commercial software. All of this imported code becomes code an organization has to manage. These libraries introduce security flaws like sensitive data exposure or access control thereby posing a risk to the enterprise application systems. To add to the complexity, the number of external libraries varies based on the application language creating hundreds of dependencies. Application attack surface is not only limited to the code included but also the libraries have their own dependencies. The indirectly included libraries are called transitive dependencies and they can represent attack surface below the visibility of software maintainers. And these second-order dependencies can have their own interdependencies between libraries in the ecosystem. As the percentage of interconnected libraries increases so does the potential flaws and the ability to manage them. The security threat increases with server-side applications.

In addition, computing systems of large enterprises may feature thousands of computing devices, servers, storage nodes, and the like. These systems may run thousands of different computing applications that perform many different functions. Some of these may be the applications developed in-house, others may be applications developed by external vendors.

Another factor is the usage of software licenses, proprietary and open sources licenses. Based on the type of license, compliance requirements change and with the flux of hybrid cloud environments to deliver services, the IT ecosystem becomes highly complex to manage and challenging. Hence the need to effectively manage the resources to demonstrate compliance and reduce risk to the IT ecosystem and improve agility.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Figure 1:
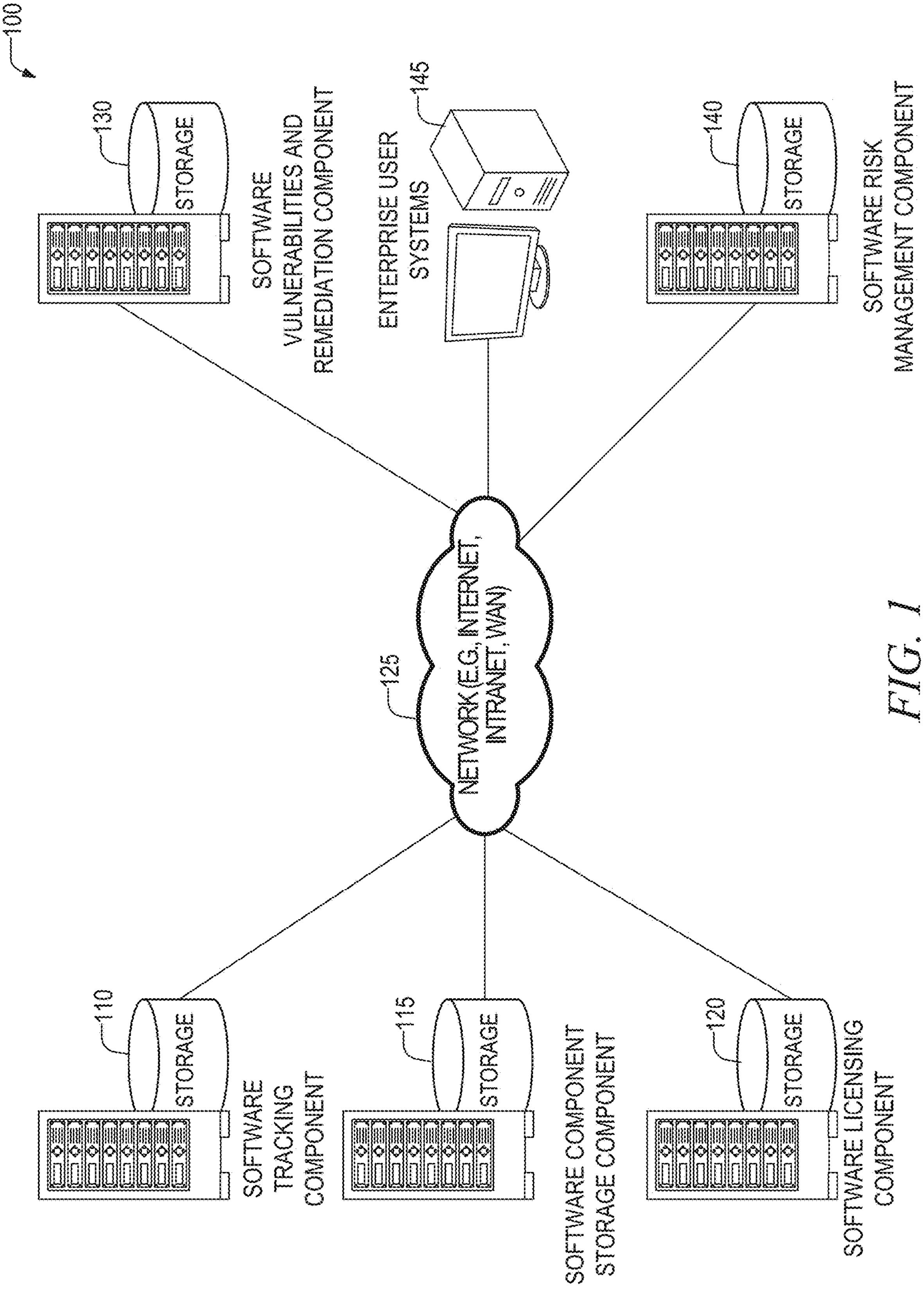
FIG. 1 illustrates a block diagram of an example enterprise software management system (ESMS) according to some examples of the present disclosure.

Development and deployment of software across a large enterprise creates many challenges. For example, developers (either in-house or vendors) may use third-party components when developing their software to solve various problems rather than start from scratch. This has many benefits including reduced development time and increased quality. The usage of third-party components may also have downsides. As the prevalence of using third party components increases, tracking these components may be challenging as developers may not always document the usage of these components. Licenses for these components may be varied and may create legal challenges, headaches, and compliance issues. For example, using components covered by certain open-source licenses may have certain legal obligations to disclose potentially proprietary code. It becomes important to manage risk by ensuring that these terms are adhered to. In addition, these components may be updated periodically by their creators to fix bugs, security issues, or increase functionality. If a component is revealed to have a security defect, it becomes important to find all software using this component and update the component within the software to fix the defect. Additionally, while these updates seek generally to reduce defects, increase functionality, or increase security; they may unintentionally introduce additional defects or worse, a malicious actor may seek to introduce malicious code.

A sophisticated enterprise may have hundreds of applications deployed across many different systems. These hundreds of applications may use an aggregate of thousands of different software components. Simply tracking and managing all the various applications and components to apply patches, ensure compliance with license terms, and monitor security threats throughout such an enterprise presents significant technical challenges.

Disclosed in some examples is an enterprise software management system (ESMS) that manages procurement, deployment, security, and maintenance of software in large enterprises. The ESMS may include one or more of a software tracking component, a software component storage component, a licensing repository component, a software vulnerabilities detection component, and a software risk management component. The ESMS governs and manages software applications and components to reduce legal, security, and other risks to the enterprise environment. The ESMS solves the technical problem of tracking and managing software and components using the technical solution of a tracking framework that utilizes interconnected systems that document, track, and ensure compliance with enterprise software goals. This improves the functioning of the computer systems within the enterprise by increasing security, decreasing software defects, and increasing availability.

The software libraries management and governance framework and system allows an enterprise to manage the holistic footprint of software libraries across the enterprise. It will evaluate and reduce risks within the new development environment. The framework and system cuts across IT ecosystem, application development, asset management, security, procurement, supply chain and other governance functions. It encapsulates the need to reimagine governance in an automated, continuous and SHIFT left methodology and address the currency of software libraries within an integrated enterprise system.

In some examples, the software tracking component may serve as a software registry that maintains a centralized system-of-record for applications and their components. The software registry may allow for administrators to understand the overall aggregate risk of one or more applications or components, understand what operating system components development teams are using, and may allow for regular audits, reconciliations, and reporting. The software tracking component may be used when introducing or developing new software applications. The software tracking component may be a database that includes a centralized inventory or system-of-record that registers all applications; their components and versions; licenses; and vulnerabilities. The software tracking component may allow the enterprise to understand the overall aggregate risk, what OS components development teams are using, allow for regular audits, reconciliation, and reporting. The software tracking component may generate one or more dependency graphs which may describe, in graphical form, dependencies between various software applications and components. For example, a software application's dependency graph may have a head node and branches showing components that are necessary to the application. Each component may then have other components that it requires as sub-nodes, and so on.

In some examples, the software tracking component may automate a deployment process for a software application or component in an enterprise computing system. Successfully completing this deployment process for a particular software application or component may authorize the application or component for use in the enterprise or within another application. For example, an administrator or developer that wishes to use an application or component may first search the software tracking component to determine if it is already approved. If it is already approved, the administrator or developer may determine, using the licensing component, whether the license of the application or component allows the use of the application or component as the administrator or developer proposes. If the license allows the deployment or usage, the software tracking component may record the additional usage of the application or component for later audit. The developer or administrator may then obtain the code for the component from the software component storage component.

For new applications or components (or new versions of an application or component) that have not yet been used, an administrator or developer may enter information about the application or component, its licenses, and the like into the software tracking component. The software tracking component may create a record in the database and determine an appropriate approval process. The approval process that is determined may be a same approval process for all applications or components or may differ and be determined based upon the type of application or component, the target computing system, a publisher of the software, or the like. For example, various attributes may be applied to a decision tree (which is a predefined data structure) that outputs an approval process data structure. The approval process data structure may be a data structure that specifies what approvals are necessary, what order the approvals are needed, and options if approvals cannot be obtained. Once the software is approved, it may be deployed or used in other software throughout the enterprise.

In some examples, one or more approval conditions of the approval process data structure may be automatically verified by the software tracking component. Example conditions may include approvals by one or more administrators of the enterprise; successful antivirus scans that do not find malware or viruses; privacy audits to ensure that personal data is handled correctly; and the like. The software tracking component may communicate with one or more other components of the ESMS. In some examples, a licensure review is one of the approval conditions. The licensure review may be discussed further in the license governance and legal obligations components.

As noted, the software tracking component stores records that document information about the software. The record may include the name of the software, a version, who approved the software, any components of the software, licensing information, and the like. The record may also link to related records in other components of the ESMS corresponding to the software application or component. For example, the record may provide a link to the source code of the software or components of the software in the software component storage component which may include a code repository. Additionally, the record may link to licenses in the software licensing component which may store licensing information that are applicable to the software or its components.

In some examples, the software tracking component may interface with users using one or more Graphical User Interfaces (GUIs) to accept input and produce output. In some examples, the software tracking component may be preconfigured with a list of common applications and/or components and the administrator or developer may select one of these applications or components and this selection may then automatically populate other details in the application record.

In some examples, the software tracking component may automatically enforce the approval process by preventing an unapproved software application and/or component from executing. For example, the software tracking component or other components may audit applications executing on the enterprise environment. Software and components may be checked to see if they are approved, their licenses are still valid and there are no known vulnerabilities. If an application or component is executing that is not approved, does not have a valid license, or has vulnerabilities, the application or component may be quarantined, prevented from executing, or a notification may be sent to an administrator. In still other examples, code modules on all the enterprise hardware may verify that a particular application or component is approved prior to executing a software application or a software application component.

In some examples, the ESMS may include a software component storage component. This may be a system-of-record for approved software components and frameworks. For example, open-source components. The software component storage component may include a repository that stores approved source code, object code, or executable code for approved software components or applications. In some examples, the system-of-record of the software tracking component for a particular application may link to one or more components in the software component storage component or to the records of the software components in an index of the software component storage component. Updates to the components may be reviewed, and when approved, posted to the software component storage component (e.g., a source repository). Applications in the enterprise may be compiled by linking to this repository of the software component storage component. Subsequent recompiled applications may then pick up these changes.

In some examples, the ESMS may include a software licensing component that allows the ESMS to determine, approve, monitor, and enforce compliance with licenses of software applications and their components. When a software application or component is input into the software tracking component, the software tracking component may notify the software licensing component. In some examples, the software tracking component may determine the license—for example, the user may upload a copy of the license, select from a list of common licenses, or the like. In these examples the software tracking component may send the license details along with details of the software or component to the software licensing component. In other examples, the software licensing component may determine the license. For example, by scraping one or more websites associated with the software application or the component (e.g., using a website with information about the software application or component provided by the administrator and/or developer to the software tracking component).

The software licensing component may store a record of the software application or component and the license in a database that may be searched and audited. In some examples, if required by the approval process (as provided by the software tracking component to the software licensing component), the software licensing component may present the license to one or more users of the software licensing component (e.g., lawyers, managers, and the like) for approval. An approval or denial may be sent by the software licensing component to the software tracking component upon receipt from a software licensing component user who is authorized by the enterprise to approve or deny licenses. In some examples, certain common licenses (e.g., MIT license or Apache) may be automatically approved. That is, the software licensing component may check the incoming license against a list of permitted licenses. If the incoming license is permitted, an approval may be generated and sent back to the software tracking component without human intervention. In some examples, certain licenses may be automatically rejected. That is, the software licensing component may additionally check the incoming license against a list of nonpermitted licenses. If the incoming license is on the list of non-permitted licenses, the license may be rejected and a rejection sent to the software tracking without human intervention. The license may be determined to be a particular common type of license through matching license terms, a drop down selection when registering the component with the software tracking component, or the like. In some examples, if the license is not on either the approved list, or the non-permitted list, the license may be sent to a user of the software licensing component for analysis and approval or disapproval.

In still other examples, a copy of the license may be obtained from the software tracking, a website of the software application and/or component and the like. The license may be scanned to determine its terms and a Natural Language Processor (NLP) may extract key terms. These key terms may be compared to a database of unacceptable key terms. If the license includes any unacceptable key terms, the license may be automatically rejected. In still other examples the NLP results may be sent along with the license in a report to a user of the software licensing component.

In some examples, the key terms may be input into one or more action components of the software licensing component. These action components may audit one or more software applications and/or components to ensure that they comply with one or more of the license terms. For example, the terms may be entered by a user of the software licensing component, determined from NLP models, or the like. Terms may be automatically or manually enforced. For example, if the license requires attribution, the software application incorporating a licensed component may be scanned to determine if the appropriate attribution code is present. In other examples, a message may be sent to the development team to inform them of the requirements. For time-based limitations or usage-based limitations, the system may continuously or at regular intervals, automatically audit the application or component usage. For example, if the license expires at a certain date, the software application or component may be prevented from executing after that date. In these examples the software licensing component may message the software tracking component, which may message the systems on which the software application or component resides to prevent further execution. The software licensing component may also provide auditing functions to audit compliance, or non-compliance with licensing obligations. In some examples, the action components are autonomous code modules that run executable code configured to check compliance with one or more licensing terms.

In some examples, the ESMS may include a software vulnerabilities detection component which may conduct dynamic scanning to scan how applications interact with their environment, and find issues with servers (e.g., deployment, configuration, and/or authentication). The software vulnerabilities detection component may conduct reactive scans that scan applications to detect known vulnerabilities, proactive scans to find new vulnerabilities, and record behavior for detailed forensic analysis. The software vulnerabilities detection component may interface with one or more comprehensive databases of both known and undisclosed vulnerabilities. In some examples, the software vulnerabilities detection component may take one or more remediation actions to mitigate a risk caused by a vulnerability.

Software vulnerabilities detection component may scan may include virus scans; malware scans; activity scans that look for network, memory access, storage access, or other activity that indicates an error, virus, break-in, bug, memory leak, performance problem, or the like. These scans may use activity templates that indicates normal activity for the same application during previous time periods (e.g., a known good releases), normal activity for similar applications, and the like. In some examples, these scans may use activity templates that are known to indicate viruses, errors, break-ins, bugs, memory leaks, performance problems, and the like. In some examples the software vulnerabilities detection component may be integrated with the development teams. Code review records, bug-tracking, compile records, release records, code scan tool records, and the like may be sent to and stored in association with the software application or component in a database of the software vulnerabilities detection component and/or the software tracking component.

The software vulnerabilities detection component may interface with one or more external security tracking databases that tracks and manages security alerts for software or software components. The software vulnerabilities detection component may receive an alert of a security defect and may log the defect. The software vulnerabilities detection component may then automatically contact the software tracking component's system-of-record and identify each product that is affected. The software vulnerabilities detection component may notify an administrator and/or may apply one or more remediations manually or automatically. For example, a software application may have one or more network parameters modified-such as prohibiting external network access; restricting certain ports; restricting certain protocols; disabling of features that are compromised by the security bug; and the like.

The software vulnerabilities detection component may also scan for unreported software applications and/or components. For example, developers may use software components that are not reported to the software tracking component. During development, after development, and throughout, the software vulnerabilities detection component may scan for known signatures of third-party source tools and code (e.g., open-source tools). Any known signatures are cross references to the software tracking component to identify whether it is approved. If not approved, appropriate alerts may be generated. The software vulnerabilities detection component data may be compiled and may be auditable. In addition, various rules may trigger alerts. For example, alerts to new defects, alerts to automated actions to mitigate threats, and the like.

The ESMS may also include a software risk management component. The software risk management component may implement strategies for development, security, and operations which assists with the integration of security at every phase of the software development lifecycle. The software risk management component provide tools for traceability, auditability, and visibility. The software risk management component provides for additional security controls within the build environment, tools for the enterprise support team for effective vulnerability management, and training and encouragement for developers to identify and fix vulnerabilities.

FIG. 1 illustrates a block diagram of an example ESMS 100 according to some examples of the present disclosure. While several discrete computing devices are shown in FIG. 1 to perform the functionality described with respect to that component, in other examples, one or more of the functionalities of one or more components may be performed by a same device. As one example, the functions of the software risk management component 140 and/or software vulnerabilities detection component 130 may be performed on systems for one or more of the other components.

Enterprise user systems 145 may be a system of one or more computing devices used by one or more developers that may be developing one or more software applications or components; administrators that are authorized to deploy software applications; administrators of one or more systems of the ESMS 100; or the like. If a developer wishes to utilize a software component in a software application under development; or if a user wishes to deploy a software application on the enterprise; the user (e.g., developer or administrator) may interface with the software tracking component 110.

Software tracking component 110 stores records related to software applications or components-including which are approved and which are denied. Software tracking component 110 may execute one or more approval processes that seeks approval from one or more users, systems, or components. The software tracking component 110 stores a record of all components of a particular software application. The software tracking component 110 may link to one or more other databases of the ESMS 100, such as code in the software component storage component 115, corresponding licenses in the software licensing component 120, and the like.

Software component storage component 115 may store source code for various software applications and/or components. For example, approved versions of software applications and/or components. This may allow developers and users to easily access an approved, virus free, malware free copy of the software application or component. In some examples, as part of the approval process, the software application or component is stored in the software component storage component 115. When updates are made to the software or component, they may be subjected to an approval process to ensure no viruses, malware, or defects are introduced. Once the testing is completed, the new version may be stored and released for inclusion in software applications. In some examples, the software component storage component 115 may automatically check for updates and download any updates and store the updates in a quarantined area until testing is completed, at which point it may be moved to the regular component storage. The testing may be manual or may be automatic. For example, the software vulnerabilities detection component 130 may scan the updates. Results of the tests may be stored (either at the software component storage component 115, or the software tracking component 110) to maintain an audit trail.

Software licensing component 120 may store licenses, license terms, and the like for software and software modules. The licenses may be pre-stored (e.g., a number of popular licenses and their terms may be manually entered) and selected by a user, or may be automatically downloaded from a license source when a new software and/or software component is added under the software tracking component 110. The software licensing component may extract one or more license terms (e.g., using manual input, NLP algorithms or the like) and spawn one or more tasks to verify that the organization is complying with the license terms. The results of these checks may be saved and stored to maintain an audit trail.

Software vulnerabilities detection component 130 may actively or passively scan for vulnerabilities and defects within source code, object code, executing code, or the like. The software vulnerabilities detection component may communicate with a third-party vulnerability reporting system to receive updates on new vulnerabilities discovered by researchers. Upon discovering a vulnerability, the software tracking component 110 may be consulted to determine which software applications include the component. The software vulnerabilities detection component 130 may take remedial measures to protect user data, prevent intrusions, and maintain the security and functioning of the enterprise systems. Remediations may be automatic or manual. For example, a software application or component may be quarantined by restricting access to/from certain network resources, prevented from running in privileged modes, quarantined from access to customer data, restricted from executing altogether, or the like. Once the vulnerability is patched, the remediation measures may be lifted.

Software risk management component 140 may implement one or more scans and/or processes during software development, production, and execution to find and remediate issues. This component may provide one or more GUIs to provide audits, forensic analysis tools, and dashboards to show the security, defect rates and information, and the like.

Components of the ESMS 100 may be interconnected using one or more networks, such as network 125. Example networks may include a Local Area Network (LAN), a Wide Area Network (WAN), the Internet, an Extranet, and the like.

Figure 2:
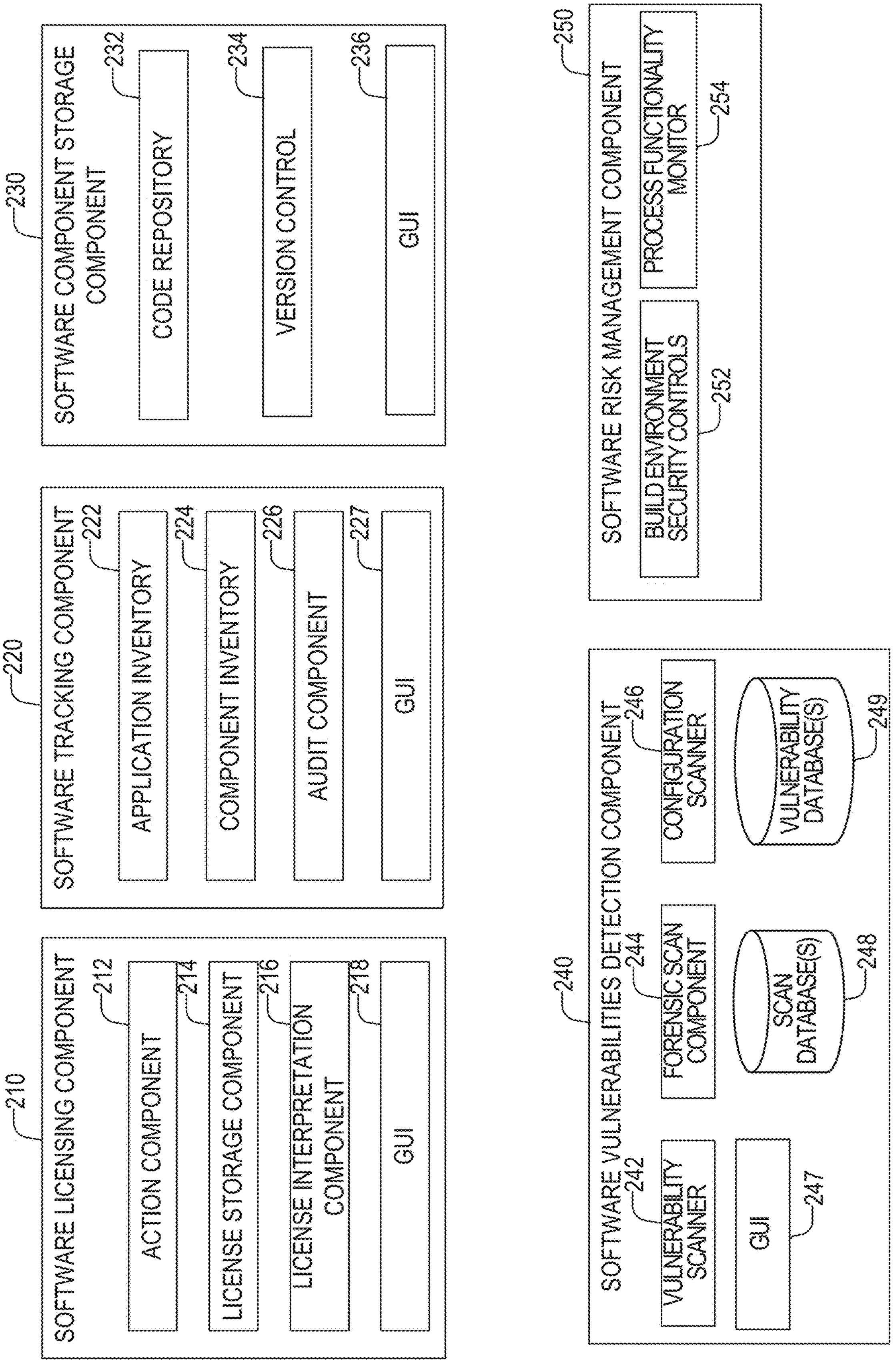
FIG. 2 illustrates a logical block diagram of the components of FIG. 1 showing additional details of the systems of FIG. 1.

FIG. 2 illustrates a logical block diagram of the components of FIG. 1 showing additional details of the systems of FIG. 1. Software tracking component 220 may include an application inventory component 222 which may store records on each software application managed by the ESMS. Each record may include a publisher, the platforms where the application is used, contact information for the owners of the platforms where the application is used, license information (and/or links to the license on the software licensing component 210), and a list of components. The component inventory 224 provides the same information, but for software application components. Records of applications in the application inventory component 222 may be linked to one or more components in the component inventory 224 that the application utilizes.

Audit component 226 may allow for producing reports of which applications are running on which systems, which components are in each application, and the like. GUI component 227 may provide one or more GUIs to allow individuals to register applications, components, and the like. In addition, the GUI component allows users to interface with audit component 226 to provide audit reports, and the like. In addition, the GUI component 227 may provide for entering approvals, disapprovals, or the like.

Software licensing component 210 may include a license storage component 214 which may store one or more licenses and may store information on one or more terms of each license. For example, the license may be stored in a record with the text of the license and with, or have pointers to, a list (e.g., a linked list data structure) of one or more data structures with license terms. For example, a structure such as <type=term, value=10> for a 10-year license duration term. The type field indicates a license term and is one of a predetermined set of terms. The values may include one or more specific values related to the term. Examples include term, payment, usage limits, and the like.

License interpretation component 216 may scan a new license and extract one or more key terms using a NLP algorithm. This scan and extraction may be used to fill in the license storage data structure. In some examples, the GUI component 218 may receive input from a user specifying a location of the license, and to confirm the automatically extracted license terms. Action component 212 may interpret the license terms and create one or more tasks that ensure compliance and create an audit trail. For example, if the term is 5 years, the action component 212 may set a timer for five years from the start date of the license. Upon expiry, (or a specified time prior to expiry), the action component 212 may alert an administrator to the expiry of the license. In other examples, the action component 212 may block user access to the software application upon license expiry. Other conditions/terms may be checked by, or acted upon by, action component 212. For example, action component 212 may scan software code verifying that terms requiring attribution are complied with. In some examples, this scan may look for specific markers in the code denoting an attribution section. Once the attribution session has been found, the scan may look to see if the license attribution text is present. As noted, evidence of compliance with the license may be stored to ensure an audit trail.

Software component storage component 230 may include a code repository 232 which may store source code, object code, executable code, or other code for software applications and/or repositories. This may be accessed by development teams, which may link in these modules during compile time. Version control component 234 may coordinate versioning of the software applications or components. For example, version control component 234 may provide various controls to ensure that new versions are vetted to ensure they are virus free, malware free, and do not have serious defects. These controls may include automated scans, manual approvals, and the like. GUI 236 may allow users to view the code within code repository (subject to any license restrictions that may restrict such access); see the various versions; apply to add or upload new code or new code versions; and the like.

Software vulnerabilities detection component 240 may include a vulnerability scanner 242 that may scan for known vulnerabilities in software such as buffer overflow exploits and the like. The scans may look for particular behaviors and may perform the tests according to instruction templates stored in the scan database 248. In addition, vulnerability scanner 242 may include compile-time source scanners such as lint, and the like.

Forensic scan component 244 may record system activity for later analysis. For example, certain behaviors, problems, and break-ins may not be apparent until after they are discovered. Having a record of various system events may allow administrators to determine where the problem is located, which systems are impacted, and the like. For example, a hacker may break into a system and the forensics data may identify what was improperly accessed. Forensic data may include file accesses of systems, network accesses, and the like. Forensic scan component 244 may look at past behaviors to match them with newly emerging threat behaviors to determine if past behaviors indicate the presence of anomalous activity. For example, a new threat may emerge with a certain pattern of network access behavior. Security researchers may determine this behavior pattern and upload it to the software vulnerabilities detection component 240. The forensic scan component 244 may scan past behavior looking for the signature of this behavior pattern to determine if the enterprise system is compromised. Upon finding this behavior, the forensic scan component 244 may alert an administrator.

Configuration scanner 246 may scan for one or more misconfigurations of development tools, production systems, and the like. The configuration scanner 246 may scan for one or more misconfigurations by executing one or more misconfiguration scanning modules in the scan database 248. Scans may include port scans, protocol scans, and the like.

Vulnerability scanner 242 may also link with a vulnerability database 249, which may be external to the ESMS and may be external to the enterprise. Vulnerability database 249 may identify published vulnerabilities in software applications or components. Upon detecting an added vulnerability in the vulnerability database 249, vulnerability scanner 242 may communicate with software tracking component 220 to identify affected systems and implement mitigations. GUI component 247 may allow users to select scans to run, see results, audit the results for software applications or components, setup the scans, setup the configuration scanner, and otherwise configure the component, and the like.

Software risk management component 250 may include build environment security controls component 252 which may scan the build environment for issues. The build servers and code repositories may be scanned to ensure that they are not compromised. In addition, the code itself may be scanned for known security issues. Software risk management component 250 may include a process functionality monitor component 254 which may allow users to monitor the development process, ensure all components are properly registered, and the like. For example, process functionality monitor component 254 may scan code to ensure that all software components are registered properly. That is, it may have signatures of popular software components that it may search for in software code to ensure that any such usage of this code is approved.

Figure 3:
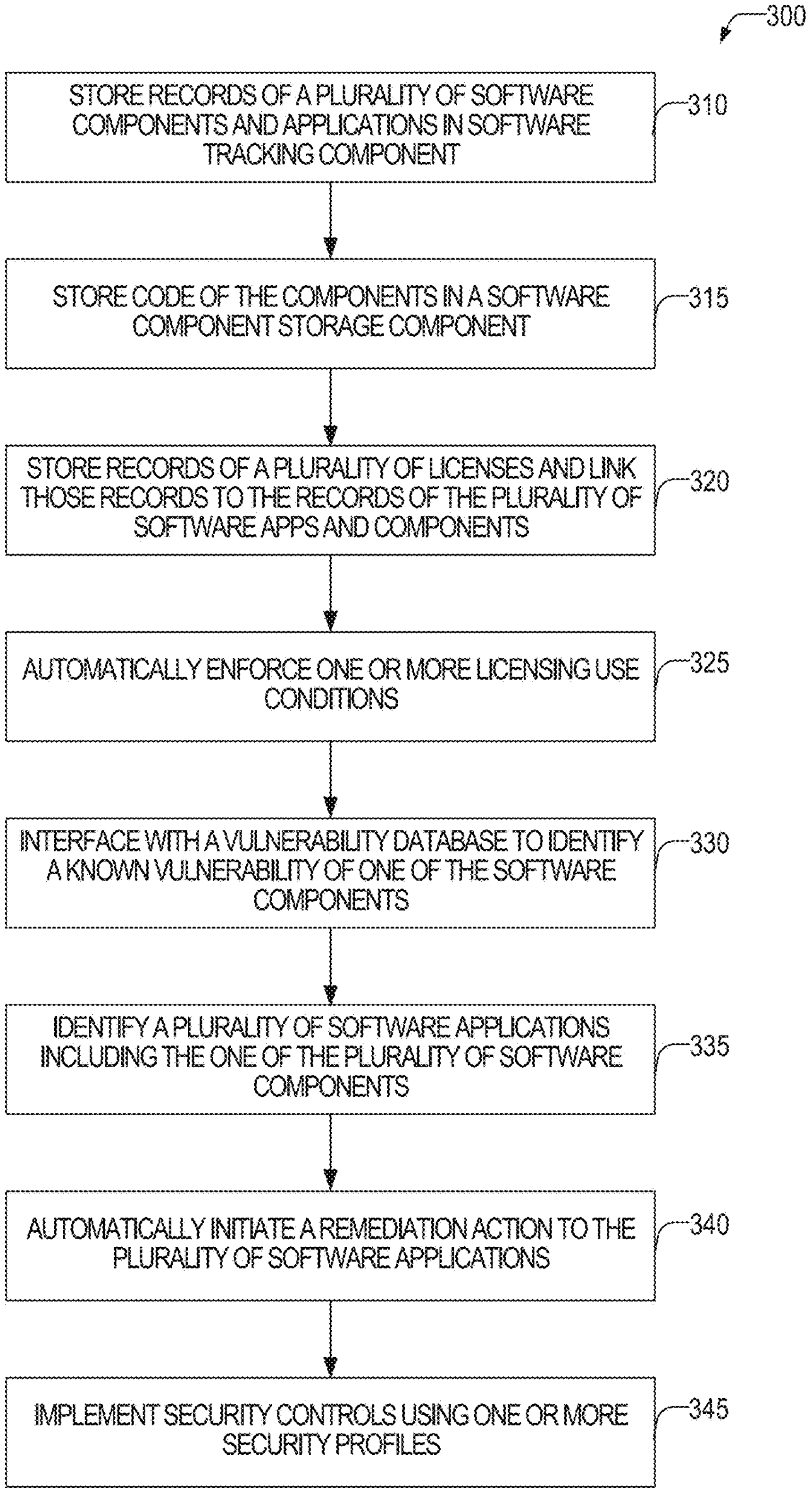
FIG. 3 illustrates a flowchart of a method of an ESMS system according to some examples of the present disclosure.

FIG. 3 illustrates a flowchart of a method 300 of an ESMS system according to some examples of the present disclosure. At operation 310, the ESMS may store records of a plurality of software components in a system-of-record, such as in a software tracking component. The system-of-record may be a database, and each of the software application components may be stored as a record. The records for a software component may link to the source code of the component in a source code repository, link to the applications in which the component is included, the licenses which govern usage of the software component in the software licensing component, and the like. Additionally, the system-of-record may have records for each software application. A software application is a complete application whereas a software component is a portion of an application. The records of applications may include links to software component records for components of the application as well as licenses which govern usage of the application in the software licensing component, code for the application in the source code repository, and the like. In addition, the records for the application or components may include records to known security vulnerabilities, links to approvals given to the software or components by users, and the like.

At operation 315, the ESMS may store, in a software component storage component, code for a plurality of software components, the plurality of software components approved by an enterprise prior to storage in the software component storage component. The code may be one or more of: source code, object code, executable code, or the like.

At operation 320, the ESMS may store records for each of a plurality of software application and/or component licenses and link the records of the license to the records in the system-of-record of the software components and applications governed by those licenses. The license records may be stored in a database which may be a same database or a different database than the system-of-record. In some examples, the records of the licenses include licensing terms that are associated with, or mapped to, usage conditions of the software applications or components. The records may include one or more of the text of the license, key terms, and the like. The terms may be usage restrictions that regulates a usage of the component or software application including a term of usage, a duration of usage, a number of total users that may use the component or software applications, a number of concurrent users that may use the component or software application, and the like.

At operation 325, the ESMS may automatically enforce one or more licensing conditions. For example, by automatically restricting access to one or more of the plurality of software applications containing the software components. For example, by restricting usage when a license expires, restricting a simultaneous number of copies that are executing, restricting the number of users that has access to the software component, and the like.

At operation 330, the system may interface with a vulnerability database to identify a known vulnerability of one of the software components. For example, a software vulnerabilities detection component may interface with a vulnerabilities database and get notified when new vulnerabilities are discovered.

When a new vulnerability is discovered, the system may communicate with the system of record (e.g., in the software tracking component) to determine which software applications include the software component identified by the new vulnerability at operation 335. The system may automatically initiate a remediation action for the identified software applications at operation 340. Remediation actions may include quarantining the application, blocking network access, and the like.

At operation 345, the ESMS may implement one or more security controls using one or more security profiles. For example, applications or software components may be subjected to one or more security profiles. For example, the profile may specify one or more active, passive, or forensic scans and a frequency or condition for performing the scan. The software risk management component may implement these controls. Other examples, include controls over the development environment to require certain scans, checks, and procedures, and the like.

Figure 4:
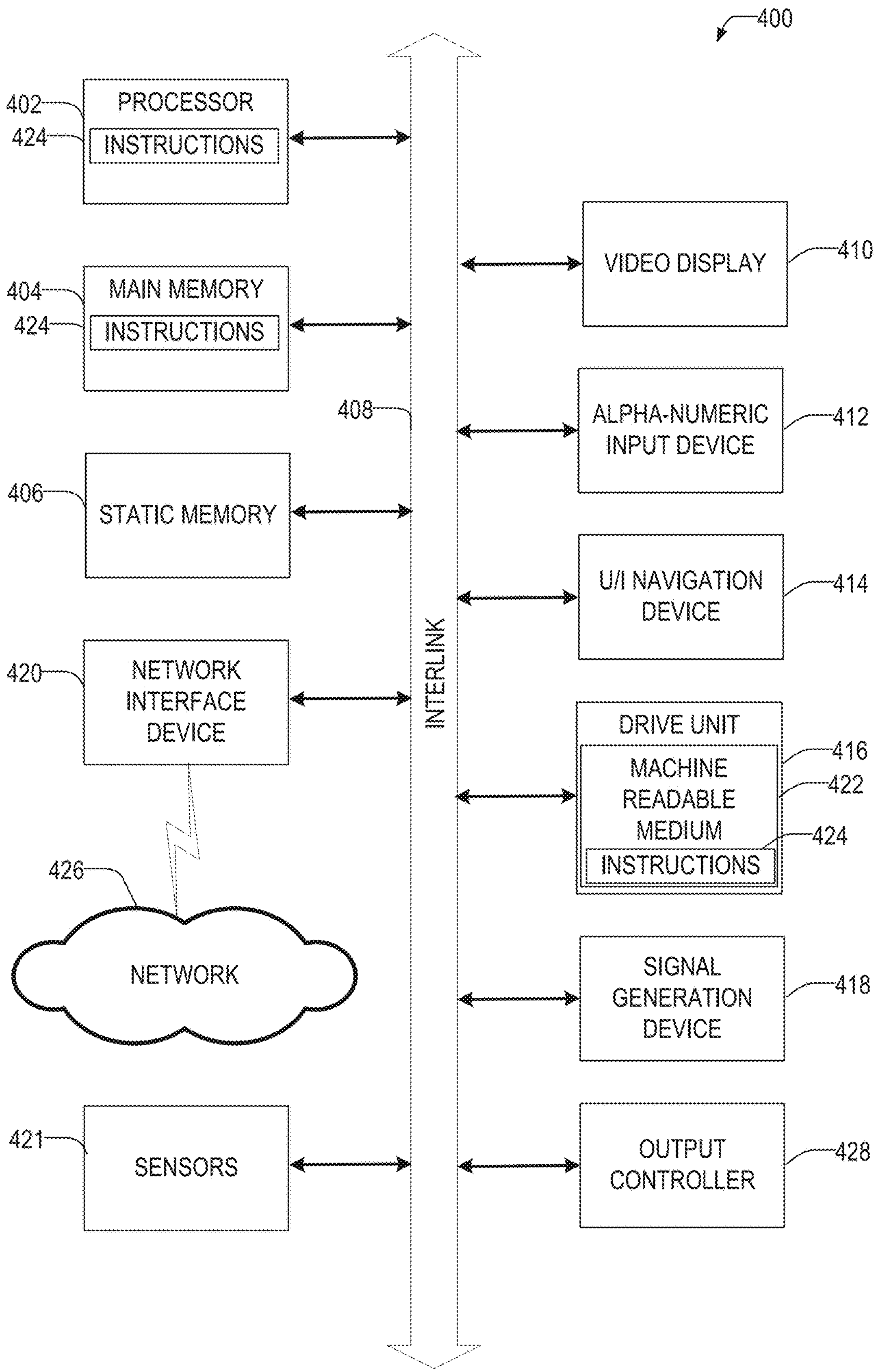
FIG. 4 illustrates a block diagram of an example machine upon which any one or more of the techniques (e.g., methodologies) discussed herein may be performed.

FIG. 4 illustrates a block diagram of an example machine 400 upon which any one or more of the techniques (e.g., methodologies) discussed herein may be performed. In alternative embodiments, the machine 400 may operate as a standalone device or may be connected (e.g., networked) to other machines. In a networked deployment, the machine 400 may operate in the capacity of a server machine, a client machine, or both in server-client network environments. In an example, the machine 400 may act as a peer machine in peer-to-peer (P2P) (or other distributed) network environment. The machine 400 may be in the form of a personal computer (PC), a tablet PC, a set-top box (STB), a personal digital assistant (PDA), a mobile telephone, a smart phone, a web appliance, a network router, switch or bridge, a server, or any machine capable of executing instructions (sequential or otherwise) that specify actions to be taken by that machine. Machine 400 may be configured to implement any of the components of FIGS. 1 and 2 and the methods of FIG. 3. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples, as described herein, may include, or may operate on one or more logic units, components, or mechanisms (hereinafter "components"). Components are tangible entities (e.g., hardware) capable of performing specified operations and may be configured or arranged in a certain manner. In an example, circuits may be arranged (e.g., internally or with respect to external entities such as other circuits) in a specified manner as a component. In an example, the whole or part of one or more computer systems (e.g., a standalone, client or server computer system) or one or more hardware processors may be configured by firmware or software (e.g., instructions, an application portion, or an application) as a component that operates to perform specified operations. In an example, the software may reside on a machine readable medium. In an example, the software, when executed by the underlying hardware of the component, causes the hardware to perform the specified operations of the component.

Accordingly, the term "component" is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which component are temporarily configured, each of the components need not be instantiated at any one moment in time. For example, where the components comprise a general-purpose hardware processor configured using software, the general-purpose hardware processor may be configured as respective different components at different times. Software may accordingly configure a hardware processor, for example, to constitute a particular module at one instance of time and to constitute a different component at a different instance of time.

Machine (e.g., computer system) 400 may include one or more hardware processors, such as processor 402. Processor 402 may be a central processing unit (CPU), a graphics processing unit (GPU), a hardware processor core, or any combination thereof. Machine 400 may include a main memory 404 and a static memory 406, some or all of which may communicate with each other via an interlink (e.g., bus) 408. Examples of main memory 404 may include Synchronous Dynamic Random-Access Memory (SDRAM), such as Double Data Rate memory, such as DDR4 or DDR5. Interlink 408 may be one or more different types of interlinks such that one or more components may be connected using a first type of interlink and one or more components may be connected using a second type of interlink. Example interlinks may include a memory bus, a peripheral component interconnect (PCI), a peripheral component interconnect express (PCIe) bus, a universal serial bus (USB), or the like.

The machine 400 may further include a display unit 410, an alphanumeric input device 412 (e.g., a keyboard), and a user interface (UI) navigation device 414 (e.g., a mouse). In an example, the display unit 410, input device 412 and UI navigation device 414 may be a touch screen display. The machine 400 may additionally include a storage device (e.g., drive unit) 416, a signal generation device 418 (e.g., a speaker), a network interface device 420, and one or more sensors 421, such as a global positioning system (GPS) sensor, compass, accelerometer, or other sensor. The machine 400 may include an output controller 428, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 416 may include a machine readable medium 422 on which is stored one or more sets of data structures or instructions 424 (e.g., software) embodying or utilized by any one or more of the techniques or functions described herein. The instructions 424 may also reside, completely or at least partially, within the main memory 404, within static memory 406, or within the hardware processor 402 during execution thereof by the machine 400. In an example, one or any combination of the hardware processor 402, the main memory 404, the static memory 406, or the storage device 416 may constitute machine readable media.

While the machine readable medium 422 is illustrated as a single medium, the term "machine readable medium" may include a single medium or multiple media (e.g., a centralized or distributed database, and/or associated caches and servers) configured to store the one or more instructions 424.

The term "machine readable medium" may include any medium that is capable of storing, encoding, or carrying instructions for execution by the machine 400 and that cause the machine 400 to perform any one or more of the techniques of the present disclosure, or that is capable of storing, encoding or carrying data structures used by or associated with such instructions. Non-limiting machine readable medium examples may include solid-state memories, and optical and magnetic media. Specific examples of machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); Solid State Drives (SSD); and CD-ROM and DVD-ROM disks. In some examples, machine readable media may include non-transitory machine readable media. In some examples, machine readable media may include machine readable media that is not a transitory propagating signal.

The instructions 424 may further be transmitted or received over a communications network 426 using a transmission medium via the network interface device 420. The Machine 400 may communicate with one or more other machines wired or wirelessly utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks such as an Institute of Electrical and Electronics Engineers (IEEE) 802.11 family of standards known as Wi-Fi®, an IEEE 802.15.4 family of standards, a 5G New Radio (NR) family of standards, a Long Term Evolution (LTE) family of standards, a Universal Mobile Telecommunications System (UMTS) family of standards, peer-to-peer (P2P) networks, among others. In an example, the network interface device 420 may include one or more physical jacks (e.g., Ethernet, coaxial, or phone jacks) or one or more antennas to connect to the communications network 426. In an example, the network interface device 420 may include a plurality of antennas to wirelessly communicate using at least one of single-input multiple-output (SIMO), multiple-input multiple-output (MIMO), or multiple-input single-output (MISO) techniques. In some examples, the network interface device 420 may wirelessly communicate using Multiple User MIMO techniques.

Other Examples

Example 1 is a system for software management, the system comprising: one or more processors configured to implement: a software tracking component, the software tracking component configured to: record a software component used by an enterprise in a software component record, the software component record including a link to a source code location where source code for the software component is stored in a software component storage component; record a software application used by the enterprise in a software application record, the software application record including links to the software component record, the software component part of the software application; the software component storage component configured to: store code for the software component, the software component approved by the enterprise prior to storage in the software component storage component; a software licensing component configured to: store a software license record of a software license, the software license record including a link to the software application record in the software tracking component indicating that the software application is governed by the software license, the software license record including a licensing term mapped to a usage condition; and automatically cause access to be restricted to the software application containing the software component to enforce the usage condition; a software vulnerabilities and remediation management component configured to: interface with a vulnerability database to identify a known vulnerability of the software component; communicate with the software tracking component to identify that the software application includes, the software component; and automatically initiate a remedial action applied to the software application to address the known vulnerability responsive to identifying that the software application includes the software component; and a software risk management component configured to implement security controls over the software component using one or more security profiles based upon the software license record.

In Example 2, the subject matter of Example 1 includes, wherein the software licensing component is further configured to identify the license term using a natural language processing algorithm.

In Example 3, the subject matter of Example 2 includes, wherein the software licensing component is further configured to determine that the license term is violated based upon monitoring usage of the software application and take automatic action to restrict usage of the software application.

In Example 4, the subject matter of Examples 1-3 includes, wherein the software vulnerabilities and remediation management component is further configured to scan source code of the software application to identify that a second software component included in the software application is not registered with the software tracking component.

In Example 5, the subject matter of Examples 1~4 includes, wherein the software vulnerabilities and remediation management component is further configured to scan source code of the software application to identify a source code vulnerability.

In Example 6, the subject matter of Example 5 includes, wherein the software vulnerabilities and remediation management component is further configured to scan source code of the software application to identify code errors.

In Example 7, the subject matter of Example 6 includes, wherein the software vulnerabilities and remediation component is further configured to: monitor a behavior of the software application executing on an enterprise computing device; compare the monitored behavior of the software application to a stored pattern indicating anomalous behaviors; find a match between the monitored behavior of the software application and the stored pattern indicating anomalous behaviors; and responsive to finding the match, quarantine the software application.

In Example 8, the subject matter of Examples 1-7 includes, wherein the remedial action comprises quarantining the software component.

In Example 9, the subject matter of Examples 1-8 includes, wherein the remedial action comprises restricting access to an external network.

In Example 10, the subject matter of Examples 1-9 includes, wherein the software tracking component is further configured to generate dependency graphs describing software component dependencies.

Example 11 is a method for software management, the method comprising: performing on one or more processors, operations comprising: recording a software component used by an enterprise in a software component record at a software tracking component, the software component record including a link to a source code location where source code for the software component is stored in a software component storage component; recording a software application used by the enterprise in a software application record at the software tracking component, the software application record including links to the software component record, the software component part of the software application; storing code for the software component at the software component storage component, the software component approved by the enterprise prior to storage in the software component storage component; storing a software license record of a software license at a software licensing component, the software license record including a link to the software application record in the software tracking component indicating that the software application is governed by the software license, the software license record including a licensing term mapped to a usage condition; and automatically causing access to be restricted to the software application containing the software component at the software licensing component to enforce the usage condition; interfacing, at a software vulnerabilities and remediation management component, with a vulnerability database to identify a known vulnerability of the software component; communicating, at the software vulnerabilities and remediation management component, with the software tracking component to identify that the software application includes, the software component; automatically initiating, at the software vulnerabilities and remediation management component, a remedial action applied to the software application to address the known vulnerability responsive to identifying that the software application includes the software component; and implementing security controls over the software component at a software risk management component using one or more security profiles based upon the software license record.

In Example 12, the subject matter of Example 11 includes, wherein identifying the license term comprises using a natural language processing algorithm.

In Example 13, the subject matter of Example 12 includes, determining that the license term is violated based upon monitoring usage of the software application and take automatic action to restrict usage of the software application.

In Example 14, the subject matter of Examples 11-13 includes, scanning source code of the software application at the software vulnerabilities and remediation management component to identify that a second software component included in the software application is not registered with the software tracking component.

In Example 15, the subject matter of Examples 11-14 includes, scanning source code of the software application at the software vulnerabilities and remediation management component to identify a source code vulnerability.

In Example 16, the subject matter of Example 15 includes, scanning source code of the software application to identify code errors at the software vulnerabilities and remediation management component.

In Example 17, the subject matter of Example 16 includes, monitoring a behavior of the software application executing on an enterprise computing device at the software vulnerabilities and remediation component; comparing the monitored behavior of the software application to a stored pattern indicating anomalous behaviors at the software vulnerabilities and remediation component; finding a match between the monitored behavior of the software application and the stored pattern indicating anomalous behaviors at the software vulnerabilities and remediation component; and responsive to finding the match, quarantining the software application.

In Example 18, the subject matter of Examples 11-17 includes, wherein the remedial action comprises quarantining the software component.

In Example 19, the subject matter of Examples 11-18 includes, wherein the remedial action comprises restricting access to an external network.

In Example 20, the subject matter of Examples 11-19 includes, generating dependency graphs describing software component dependencies at the software tracking component.

Example 21 is a non-transitory machine-readable medium, storing instructions for software management, the instructions, which when executed by a machine, cause the machine to perform operations comprising: recording a software component used by an enterprise in a software component record at a software tracking component, the software component record including a link to a source code location where source code for the software component is stored in a software component storage component; recording a software application used by the enterprise in a software application record at the software tracking component, the software application record including links to the software component record, the software component part of the software application; storing code for the software component at the software component storage component, the software component approved by the enterprise prior to storage in the software component storage component; storing a software license record of a software license at a software licensing component, the software license record including a link to the software application record in the software tracking component indicating that the software application is governed by the software license, the software license record including a licensing term mapped to a usage condition; and automatically causing access to be restricted to the software application containing the software component at the software licensing component to enforce the usage condition; interfacing, at a software vulnerabilities and remediation management component, with a vulnerability database to identify a known vulnerability of the software component; communicating, at the software vulnerabilities and remediation management component, with the software tracking component to identify that the software application includes, the software component; automatically initiating, at the software vulnerabilities and remediation management component, a remedial action applied to the software application to address the known vulnerability responsive to identifying that the software application includes the software component; and implementing security controls over the software component at a software risk management component using one or more security profiles based upon the software license record.

In Example 22, the subject matter of Example 21 includes, wherein the operations of identifying the license term comprises using a natural language processing algorithm.

In Example 23, the subject matter of Example 22 includes, wherein the operations further comprise determining that the license term is violated based upon monitoring usage of the software application and take automatic action to restrict usage of the software application.

In Example 24, the subject matter of Examples 21-23 includes, wherein the operations further comprise scanning source code of the software application at the software vulnerabilities and remediation management component to identify that a second software component included in the software application is not registered with the software tracking component.

In Example 25, the subject matter of Examples 21-24 includes, wherein the operations further comprise scanning source code of the software application at the software vulnerabilities and remediation management component to identify a source code vulnerability.

In Example 26, the subject matter of Example 25 includes, wherein the operations further comprise scanning source code of the software application to identify code errors at the software vulnerabilities and remediation management component.

In Example 27, the subject matter of Example 26 includes, wherein the operations further comprise: monitoring a behavior of the software application executing on an enterprise computing device at the software vulnerabilities and remediation component; comparing the monitored behavior of the software application to a stored pattern indicating anomalous behaviors at the software vulnerabilities and remediation component; finding a match between the monitored behavior of the software application and the stored pattern indicating anomalous behaviors at the software vulnerabilities and remediation component; and responsive to finding the match, quarantining the software application.

In Example 28, the subject matter of Examples 21-27 includes, wherein the remedial action comprises quarantining the software component.

In Example 29, the subject matter of Examples 21-28 includes, wherein the remedial action comprises restricting access to an external network.

In Example 30, the subject matter of Examples 21-29 includes, wherein the operations further comprise generating dependency graphs describing software component dependencies at the software tracking component.

Example 31 is at least one machine-readable medium including instructions that, when executed by processing circuitry, cause the processing circuitry to perform operations to implement of any of Examples 1-30.

Example 32 is an apparatus comprising means to implement of any of Examples 1-30.

Example 33 is a system to implement of any of Examples 1-30.

Example 34 is a method to implement of any of Examples 1-30.

What is claimed is:

1. A system for software management, the system comprising:

one or more processors;

a software tracking component including instructions, which when executed by the one or more processors, cause the one or more processors to perform operations comprising:

record a software component used by an enterprise in a software component record, the software component record including a link to a source code location where source code for the software component is stored in a software component storage component;

record a software application used by the enterprise in a software application record, the software application record including links to the software component record, the software component being part of the software application;

scan a software license of the software component using a natural language processor to extract one or more license terms;

instantiate one or more action components, each action component being configured to audit the software application for compliance with a respective license term of the one or more extracted license terms;

detect, by an action component of the one or more action components, that the software application is non-compliant with the respective license term of the action component; and automatically cause access to be restricted to the software application containing the software component in response to the action component detecting that the software application is non-compliant with the respective license term;

a software vulnerabilities and remediation management component including instructions, which when executed by the one or more processors, cause the one or more processors to perform operations comprising:

interface with a vulnerability database to identify a known vulnerability of the software component;

communicate with the software tracking component to identify that the software application includes the software component; and automatically initiate a remedial action applied to the software application to address the known vulnerability responsive to identifying that the software application includes the software component.

2. The system of claim 1, wherein the software tracking component includes instructions, which when executed by the one or more processors, cause the one or more processors to perform additional operations comprising generating a graphical user interface (GUI) that allows administrators to manage software records.

3. The system of claim 2, wherein the software tracking component includes instructions, which when executed by the one or more processors, cause the one or more processors to perform additional operations comprising generating a dependency graph to visualize software component dependencies.

4. The system of claim 1, wherein the software application record includes a version history, developer information, and deployment status.

5. The system of claim 4, wherein the software application record includes instructions, which when executed by the one or more processors, cause the one or more processors to perform additional operations comprising recording an audit trail to track changes and approvals.

6. The system of claim 1, wherein the system includes instructions, which when executed by the one or more processors, cause the one or more processors to perform additional operations comprising enforcing usage conditions based on a license expiration date, a user limit, or a geographic restriction.

7. The system of claim 6, wherein the system includes instructions, which when executed by the one or more processors, cause the one or more processors to perform additional operations comprising providing a notification when a usage condition is about to be violated.

8. The system of claim 1, wherein the instructions of the software vulnerabilities and remediation management component further include instructions, which when executed by the one or more processors, cause the one or more processors to perform additional operations comprising performing code analysis to identify vulnerabilities.

9. The system of claim 8, wherein the instructions of the software vulnerabilities and remediation management component further include instructions, which when executed by the one or more processors, cause the one or more processors to perform additional operations comprising interfacing with a plurality of vulnerability databases.

10. The system of claim 8, wherein the instructions of the software vulnerabilities and remediation management component further include instructions, which when executed by the one or more processors, cause the one or more processors to perform additional operations comprising:

executing the software component;

observing an execution profile of the software component;

comparing the execution profile to the software component to an execution profile a component that is known to be compromised or defective;

determining that a portion of the execution profile matches a portion of the execution profile of the component that is compromised or known to be defective; and responsive to determining that a portion of the execution profile matches a portion of the execution profile of the component that is compromised or known to be defective, providing a warning in a graphical user interface.

11. A method for software management, the method comprising:

recording a software component used by an enterprise in a software component record at a software tracking component, the software component record including a link to a source code location where source code for the software component is stored in a software component storage component;

recording a software application used by the enterprise in a software application record at the software tracking component, the software application record including links to the software component record, the software component part of the software application;

scan a software license of the software component using a natural language processor to extract one or more license terms;

instantiate one or more action components, each action component being configured to audit the software application for compliance with a respective license term of the one or more extracted license terms;

detect, by an action component of the one or more action components, that the software application is non-compliant with the respective license term of the action component; and automatically cause access to be restricted to the software application containing the software component in response to the action component detecting that the software application is non-compliant with the respective license term;

interfacing with a vulnerability database to identify a known vulnerability of the software component;

communicating with the software tracking component to identify that the software application includes the software component; and automatically initiating a remedial action applied to the software application to address the known vulnerability responsive to identifying that the software application includes the software component.

12. The method of claim 11, further comprising generating a graphical user interface (GUI) that allows administrators to manage software records.

13. The method of claim 12, further comprising generating a dependency graph to visualize software component dependencies.

14. The method of claim 11, wherein the software application record includes a version history, developer information, and deployment status.

15. The method of claim 14, further comprising recording an audit trail to track changes and approvals in the software application record.

16. The method of claim 11, further comprising enforcing a usage condition based on license expiration dates, user limits, or geographic restrictions.

17. The method of claim 16, further comprising providing a notification or alert when usage conditions are about to be violated.

18. The method of claim 11, further comprising performing code analysis to identify vulnerabilities.

19. The method of claim 18, further comprising interfacing with multiple vulnerability databases to ensure comprehensive coverage.

20. The method of claim 18, further comprising:

executing the software component;

observing an execution profile of the software component;

comparing the execution profile to the software component to an execution profile a component that is known to be compromised or defective;

determining that a portion of the execution profile matches a portion of the execution profile of the component that is compromised or known to be defective; and responsive to determining that a portion of the execution profile matches a portion of the execution profile of the component that is compromised or known to be defective, providing a warning in a graphical user interface.

* * * * *